C. C. MURPHY.
CAR ROOF.
APPLICATION FILED APR. 22, 1914.

1,133,493.

Patented Mar. 30, 1915.
5 SHEETS—SHEET 1.

Witnesses:
Edgar S. Farmer
A. M. Holcombe

Inventor:
Clinton C. Murphy
By Carnet Carr
his Attys.

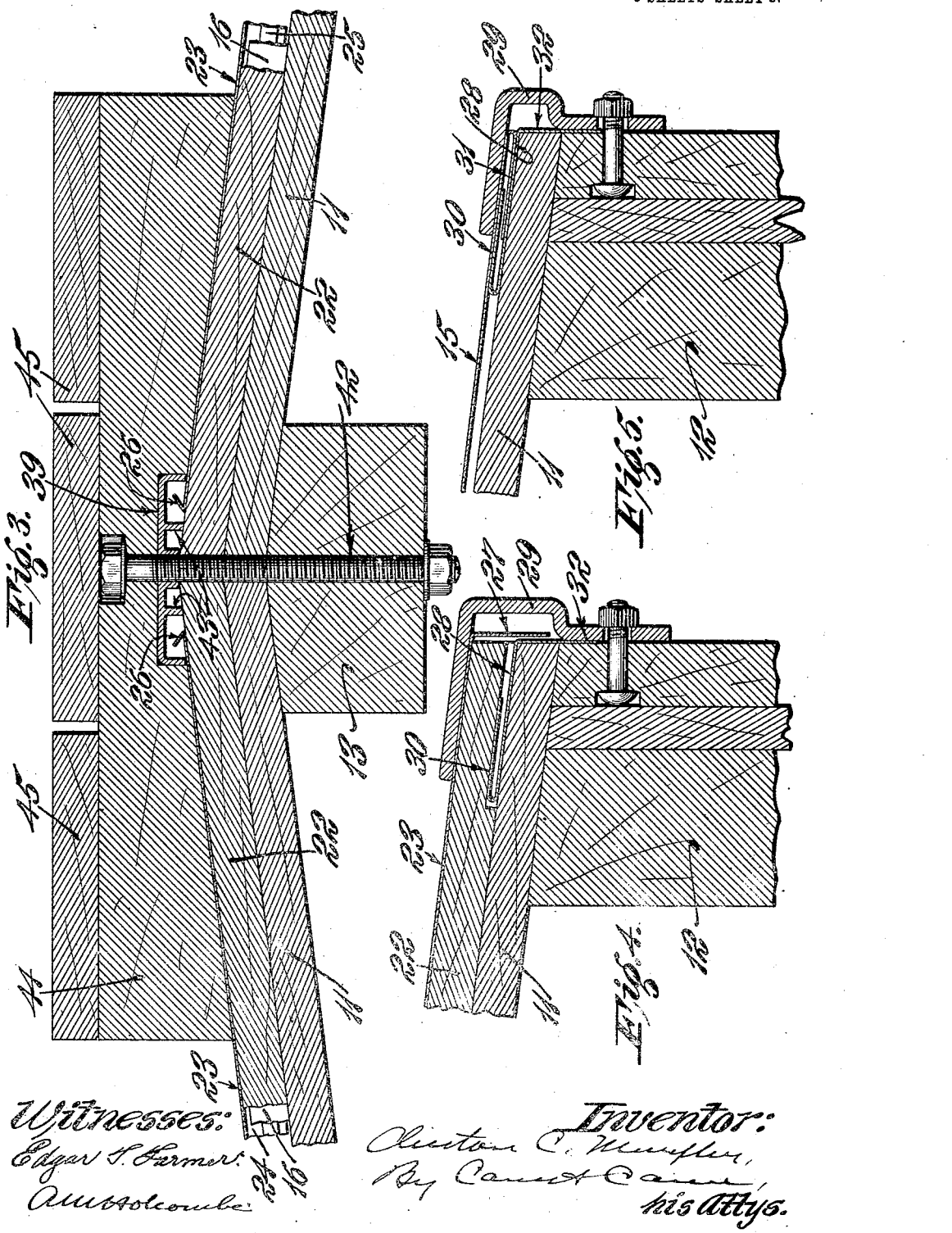

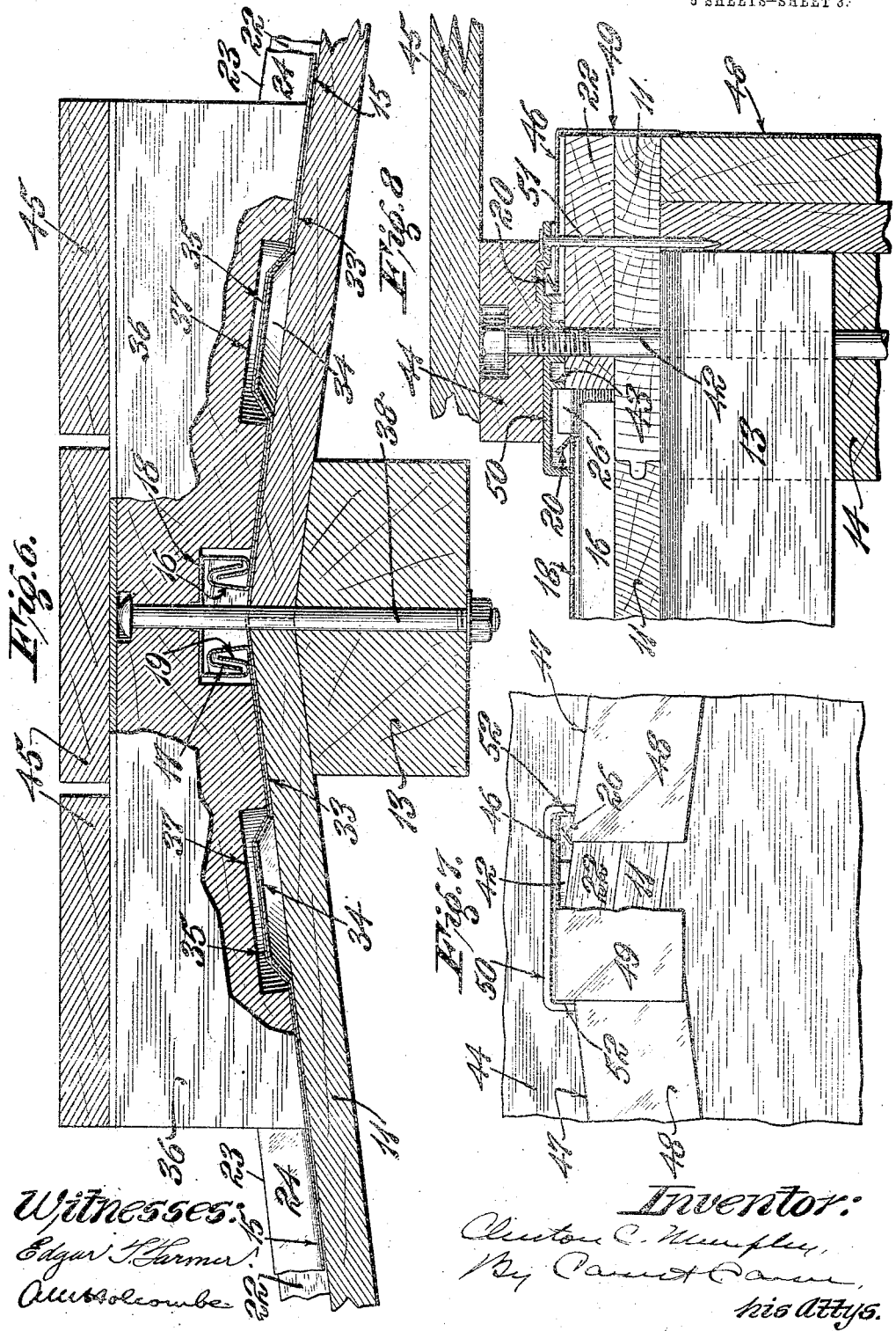

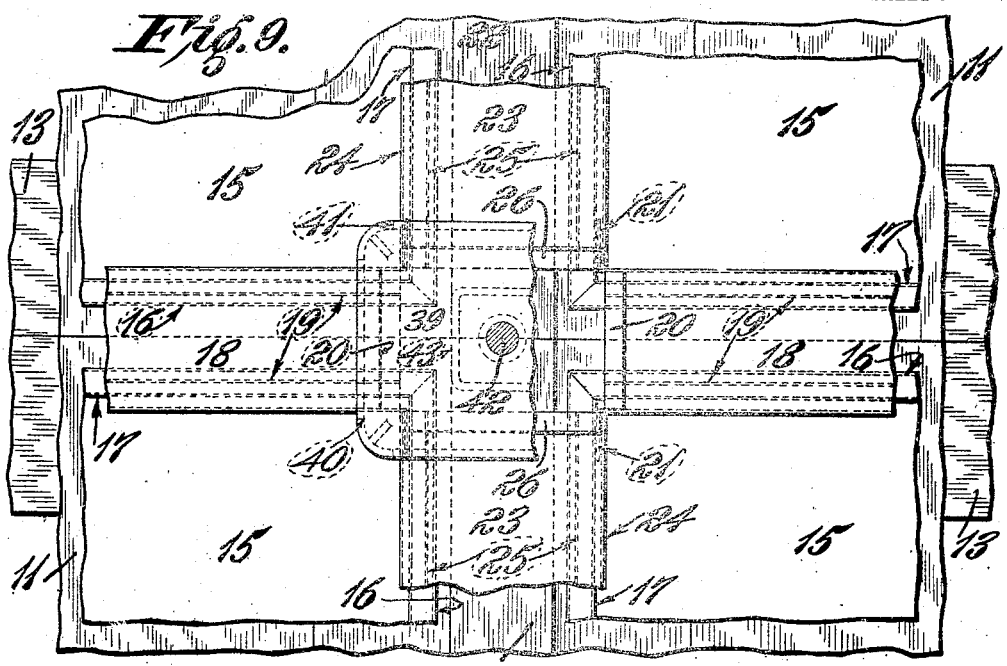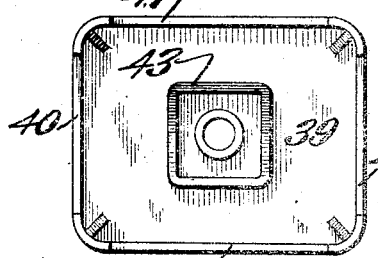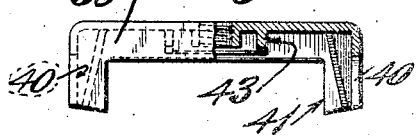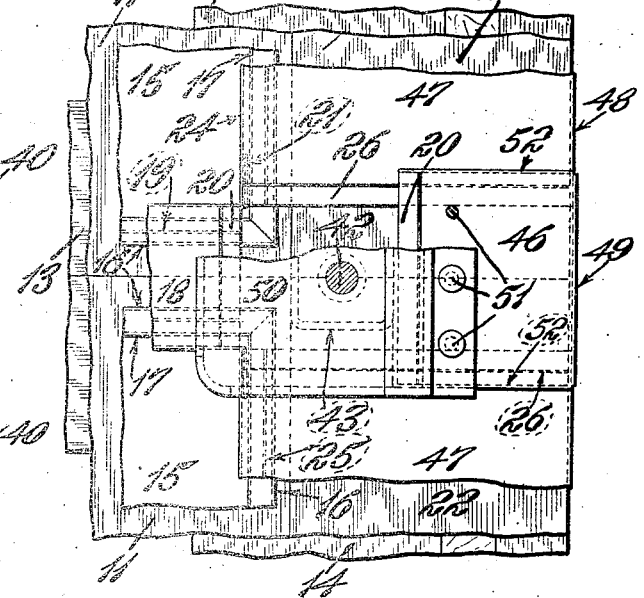

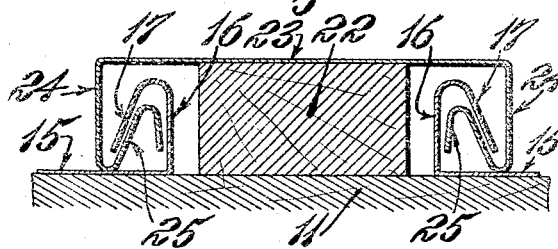
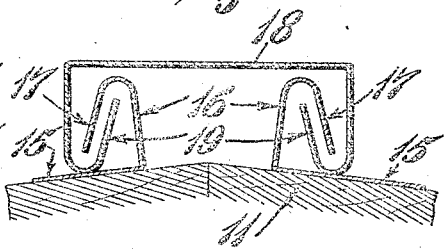
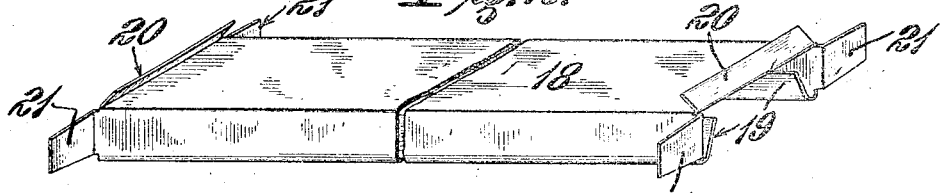
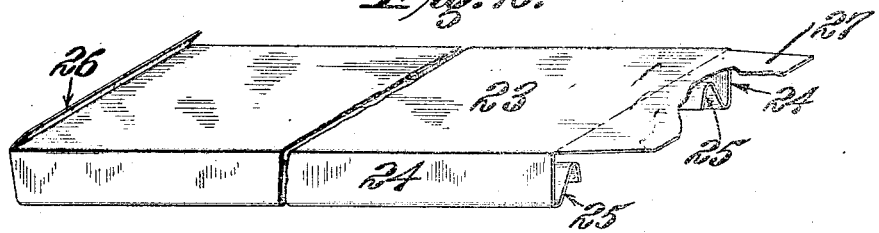
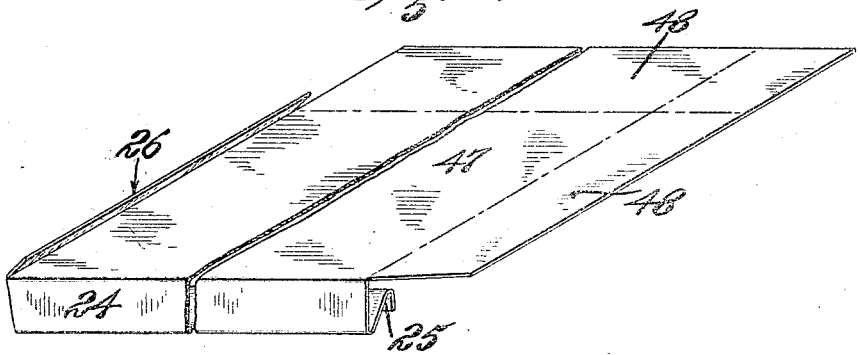
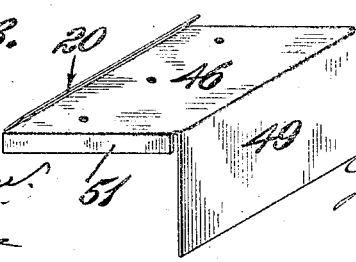

UNITED STATES PATENT OFFICE.

CLINTON C. MURPHY, OF CHICAGO, ILLINOIS.

CAR-ROOF.

1,133,493.  Specification of Letters Patent.  Patented Mar. 30, 1915.

Application filed April 22, 1914. Serial No. 833,764.

*To all whom it may concern:*

Be it known that I, CLINTON C. MURPHY, a citizen of the United States, and a resident of the city of Chicago, in the county of Cook and State of Illinois, have invented a new and useful Improvement in Car-Roofs, of which the following is a specification.

This invention relates to outside metal roofs for railway cars, and the objects of the invention are to improve the ridge construction thereof and the joints or seams between the roof sheets.

The invention consists in the form and arrangement of the metal sheets and fastening means therefor constituting the roof hereinafter described, and is more particularly defined in the appended claims.

The accompanying drawings show one form of the invention, and in connection with the following description thereof, illustrate the preferred manner of carrying out the invention.

Figure 1:
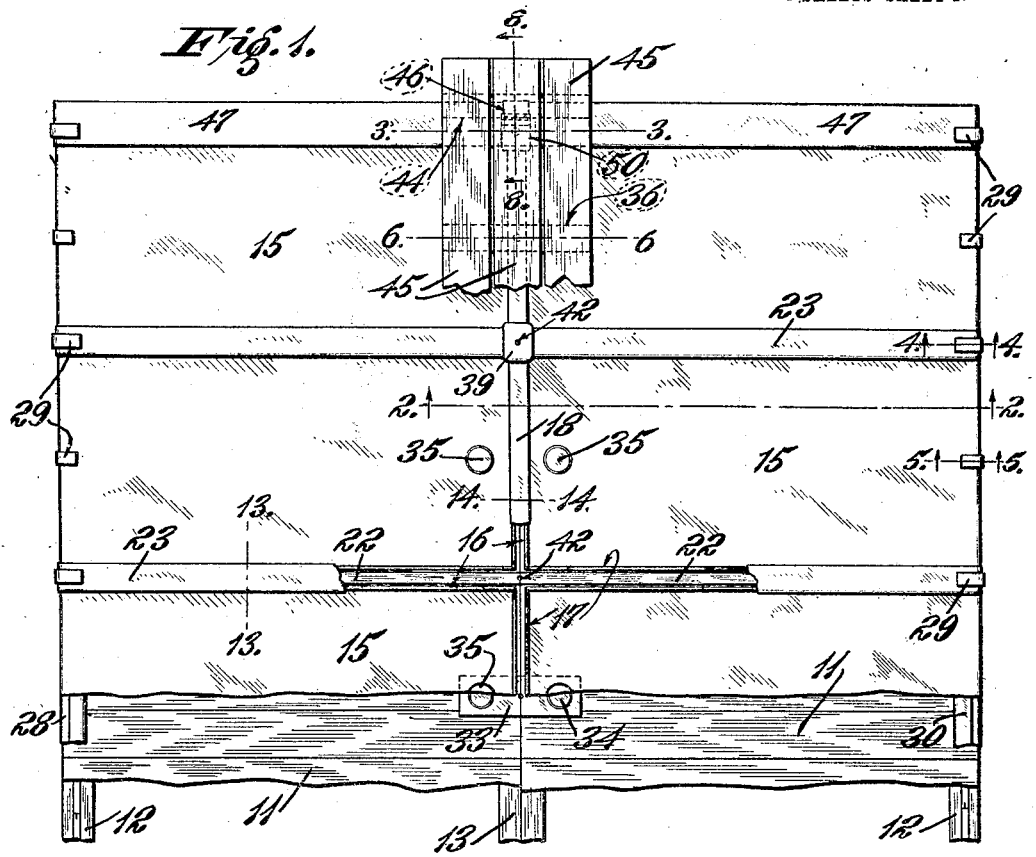
Figure 2:
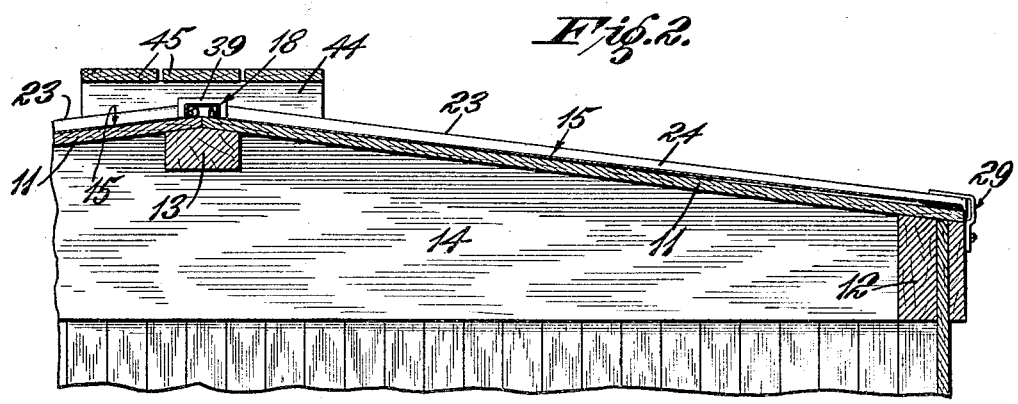

In the drawings, in which like reference characters are used to designate like parts in the several views, Figure 1 is a plan view of the end portion of a car roof embodying the invention, parts of the roof being removed to disclose the underlying construction; Fig. 2 is a vertical cross-section through the roof on the line 2—2 in Fig. 1, drawn to a somewhat larger scale than Fig. 1; Figs. 3 and 6 are vertical cross-sections of the ridge portion of the roof on the lines 3—3 and 6—6, respectively, in Fig. 1, the running board saddle in Fig. 6 being partly in elevation; Figs. 4 and 5 are vertical cross-sections of the eaves of the roof on the lines 4—4 and 5—5, respectively, in Fig. 1; Fig. 7 is an end elevation of the ridge portion of the car roof; Fig. 8 is a longitudinal section of the end of the ridge of the roof, on the line 8—8 in Fig. 1; Figs. 9 and 12 are plan views showing the arrangement of the ridge corners of the roof sheets, Fig. 9 showing the arrangement between the ends of the car and Fig. 12 the arrangement at the ends of the car; Figs. 10 and 11 are detail views of a corner cap, Fig. 10 showing the under face, and Fig. 11 the half side elevation and half central longitudinal section; Figs. 13 and 14 are cross-sections of the side and of the ridge seams or joints between the roof sheets on the line 13—13 and 14—14 in Fig. 1, respectively; Figs. 15 and 16 are perspective views of a ridge seam cover strip and a side seam cover strip, respectively; Fig. 17 is a perspective view of an end side seam cover strip; and Fig. 18 is a perspective view of an end ridge seam cover strip.

In the drawings, the metal roof constituting the invention is shown applied to a car having roof boards 11 supported at their ends by the side plate 12 and ridge pole 13. End plates 14 connect the side plates at the ends of the car and support the ridge pole. The arrangement of the substructure on which the metal car roof is applied is no part of the present invention, and may be other than as above described. The metal roof constituting my invention consists of roof sheets 15 which are arranged in pairs side by side crosswise of the car. Each roof sheet extends from the ridge to the eaves, the two roof sheets of each pair being disposed end to end on opposite sides of the ridge. The sides and ridge ends of the roof sheets are flanged up; the extremities of the flanges 16 being turned in and bent down, forming sloping inner walls 17 terminating above the margins of the sheets.

The ridge ends of the roof sheets do not quite touch, and ridge seam covers 18 of inverted channel shape straddle the end flanges, and have inturned flanges 19 bent up under the sloping inner walls 17 of the roof sheet flanges, as shown in Fig. 14. The ridge seam covers are somewhat shorter than the width of the roof sheets, and have upturned flanges 20 across the ends of their top walls, and outturned flanges 21 at the ends of their side walls. The side walls are somewhat higher than the roof sheet flanges, and the lower edges of the seam covers rest on the roof sheets, as shown in Fig. 15.

The roof sheets are separated at their sides, and battens 22 are placed crosswise of the car between the side flanges of the roof sheets, the width of the battens being slightly less than the width of the spaces between the roof sheet flanges, and the thickness of the battens being slightly more than the height of the roof sheet flanges. Side seam covers 23 of inverted channel shape are arranged over the battens, the side walls 24 of the seam covers resting on the roof sheets inside of their side flanges. The side walls of the seam covers have their lower edges turned in, the turned in portions being bent upward and then downward, forming inverted V-shape flanges 25. The V-shape flanges 25 within the side seam covers fit under the sloping inner walls 17 of the side flanges of the roof sheets, as shown in Fig. 13. The ridge ends of the side seam covers have upturned flanges 26 across their top walls and the eaves ends have projecting tops 27 which are adapted to be bent down over the eaves of the car to cover the ends of the battens and spaces between their side walls.

The eaves ends of the roof sheets and side seam covers are loosely held down upon the substructure by means of angle flashing strips 28, and angle clips 29. (See Figs. 4 and 5.) The angle flashing strips 28 are arranged lengthwise of the car along the eaves below the ends of the roof sheets, and passing underneath the battens and side seam covers. The inner margins 30 of the flashing strips are folded back over the intermediate portions, and the eaves ends 31 of the roof sheets are turned under and hooked into the turned over inner margins of the flashing strips to form a flexible joint. The outer margins 32 of the flashing strips are bent down over the side of the car, and are fastened thereto. The angle clips 29 are outside of the flashing strips, and are bolted to the side of the car below the eaves. The angle clips are spaced away from the ends of the roof sheets and side seam covers and have bent portions projecting over the eaves and overlying the roof sheets or side seam covers. The angle clips prevent the roof sheets and side seam covers from lifting off the substructure, but do not clamp them rigidly in fixed position.

The pairs of oppositely disposed roof sheets are loosely pivoted together at the middle points of their ridge ends by saddle plates 33. (See Figs. 1 and 6.) The saddle plates straddle the peak or ridge of the roof, and are provided at their ends with raised bosses 34 of inverted cup shape, which bosses project into mating inverted cup shape bosses 35 in the roof sheets. The side walls of the bosses 34 and 35 are sloping and the angle of slope from the perpendicular is slightly less than the angle of sliding friction between the roof sheet and saddle plate. Positioned above the saddle plates are running board saddles 36, having their under sides shaped to the peak of the roof and provided with recesses 37 for the roof sheet bosses. The running board saddles straddle the ridge seam covers and are fastened to the substructure by vertical bolts 38, which pass through holes in the seam covers. The seam covers are flanged up around the holes for the running board saddle bolts 38 to keep water from following the bolts into the car. The recesses in the running board saddles for the roof sheet bosses and the grooves for the ridge seam covers, are wider than the parts projecting into them in order not to bind the roof sheets.

The ridge corners of the roof sheets, and the ends of the ridge seam covers and side seam covers, are covered by corner caps 39. The corner caps are inverted pan shape, with openings 40 in their end walls to receive the ridge seam covers, and openings 41 in their side walls to receive the battens and side seam covers. The corner caps have center holes which are threaded to fit vertical bolts 42 which secure them to the substructure. Surrounding the bolt holes on the under side of the corner caps are flanges 43 which rest upon the battens and support the corner caps. The upwardly flanged ends 20 and 26 of the ridge seam covers and side seam covers project into the space surrounding the flanges 43 within each corner cap. These flanges 20 and 26 deflect water which may follow the tops of the seam covers under the corner cap off onto the corners of the roof sheets, and thus prevent it from getting into the car. Running board saddles 44 are arranged over the side seam covers, resting on them and being supported by the battens. The running board saddles 44 are recessed for the corner caps, and the securing bolts 42 for the corner caps go through the running board saddles and hold them down. Running boards 45, extending lengthwise of the car, are supported on the running board saddles and are nailed or otherwise securely fastened thereto.

At the ends of the car ridge covers 46 and side seam covers 47 of special form are provided (see Figs. 17 and 18). The outer margins 48 of the side seam covers are bent over the end of the car instead of being flanged to engage the side flange of a roof sheet. The outer end 49 of the ridge cover is likewise bent down over the end of the car, covering the gap between the ridge ends of the downturned margins of the side seam covers. The side margins 52 of the ridge covers 46 are turned down over the end flanges 20 of the seam covers 47. A special corner cap 50 is provided for the ends of the car. The end corner caps are similar to the intermediate corner caps, except that they have no end walls on the outer ends. Nails 51, passing through holes in the outer ends of the end corner caps, secure the end ridge covers in place.

From the foregoing description it is evident that the roof sheets are free to move upon the car substructure in response to distortions thereof, but are positively located in proper position and held from slipping off the eaves by the bosses and saddles. The ridge seam covers are fixed in position by bolts, and assist in maintaining the alinement of the roof sheets. The ridge and side seam covers permit movement of the roof sheets, and the form of the interlock between them prevents water from entering the car through the seams.

The invention is not restricted to the precise forms and arrangements shown in the drawings.

I claim the following as my invention:

1. A car roof consisting of roof sheets in pairs arranged crosswise of the car, the roof sheets of each pair being disposed end to end on opposite sides of the ridge and linked together for joint bodily movement, seam covers spanning the ridge ends of said roof sheets, and means for loosely securing the ridge corners of said roof sheets and said seam covers, whereby movement of said sheets is permitted.

2. A car roof consisting of roof sheets in pairs arranged side by side crosswise of the car, the roof sheets of each pair being disposed end to end on opposite sides of the ridge and loosely linked thereto for swinging and pivotal movement, channel shape seam covers spanning the ridge ends of said roof sheets, and means for loosely securing the ridge corners of said roof sheets and said seam covers whereby movement of said sheets is permitted 3. In a car roof, in combination movable roof sheets having upstanding side flanges, said sheets being arranged crosswise of the car in two rows, one on each side of the ridge, and spaced apart lengthwise thereof, battens arranged crosswise of the car between said roof sheets, said battens being of greater vertical thickness than said roof sheet flanges, movable seam covers extending from ridge to eaves over said battens and having downturned side flanges inclosing said roof sheet flanges, and ridge corner caps covering the ridge ends of said seam covers and the ridge corners of said roof sheets, said ridge corner caps having side walls loosely embracing said seam covers and inner walls bearing upon said battens and loosely spacing said corner caps above said seam covers.

4. In a car roof, in combination movable roof sheets having upstanding side flanges, said sheets being arranged crosswise of the car in two rows, one on each side of the ridge, and spaced apart lengthwise thereof, battens arranged crosswise of the car between said roof sheets, movable seam covers extending from ridge to eaves over said battens and having cross flanges on their ridge ends and downturned side flanges inclosing said roof sheet flanges, and ridge corner caps covering the ridge ends of said seam covers and the ridge corners of said roof sheets, said ridge corner caps having parallel inner and outer side walls forming recesses for the flanged ends of said seam covers, said inner walls bearing upon said battens and loosely spacing said outer walls above said seam covers.

5. In a car roof, movable roof sheets having side flanges arranged in two rows, one row on each side of the ridge, inverted channel-shape seam covers lapping the ridge ends of oppositely arranged sheets, said ridge seam covers having out-turned flanges at the ends of their side walls, inverted channel-shape seam covers lapping the side margins of adjacent sheets, said side seam covers embracing the out-turned flanges of adjacent ridge seam covers, whereby said seam covers are movably connected together and ridge corner caps loosely embracing the ends of said ridge and side seam covers whereby joint movement thereof is permitted.

6. In a car roof, movable roof sheets having side flanges arranged in two rows, one row on each side of the ridge, inverted channel-shape seam covers lapping the ridge ends of oppositely arranged sheets, said ridge seam covers having out-turned flanges at the ends of their side walls, and upturned flanges at the ends of their top walls, inverted channel-shape seam covers lapping the side margins of adjacent sheets and having upturned flanges across their ridge ends, said side seam covers embracing the out-turned flanges of adjacent ridge seam covers, whereby said seam covers are removably connected together, and ridge corner caps loosely embracing the ends of said ridge and side seam covers, said caps having capacious recesses for said upturned flanges whereby joint movement of said ridge and side seam covers is permitted.

7. A car roof comprising roof sheets arranged in pairs end to end on opposite sides of the ridge, a pivot portion near the ridge end of each of said roof sheets, ridge covers positioned over the ridge ends of oppositely disposed roof sheets, and saddles underlying said ridge covers and pivotally secured to the ridge, said saddles being provided with spaced pivot bearings engaging the pivot portions of said roof sheets, said ridge covers bearing upon said roof sheets and saddles to retain them in engaged position.

8. In a car roof, roof sheets having upstanding side marginal flanges provided with downwardly and inwardly extending extremities, said extremities terminating about halfway between the upper edge of each flange and the roof sheet, seam covers of inverted channel shape spanning the side marginal flanges of adjacent roof sheets, the side walls of said seam covers having along their lower edges inwardly and upwardly extending portions hooked into said roof sheet flanges adjacent to the inwardly extending extremities thereof and terminating in downturned extremities adjacent to the upstanding portions of said roof sheet flanges.

9. In a car roof, roof sheets having upstanding side marginal flanges provided with downwardly and inwardly extending extremities, seam covers of inverted channel shape spanning the side marginal flanges of adjacent roof sheets, the side walls of said seam covers resting on said roof sheets inside the upstanding flanges thereof and spaced therefrom and having along their lower edges inwardly and upwardly extending portions hooked into said roof sheet flanges and terminating in downturned extremities adjacent to the upstanding portions of said roof sheet flanges.

10. A seam cap for a metal car roof, said seam cap being inverted channel-shape with inturned hook flanges projecting up from the lower edges of its side walls and adapted to fit within the inturned inverted V-shaped marginal flanges of adjacent roof sheets, and downturned flanges on the under side of the cap along the inner edge of each hook flange, each inner downturned flange having its lower edge adapted to bear against the inside of the lower outer wall of the inturned V-shaped flange of the roof sheet.

CLINTON C. MURPHY.

Witnesses:
PETER F. McSHANE,
E. PAYSON SMITH.

Copies of this patent may be obtained for five cents each, by addressing the "Commissioner of Patents, Washington, D. C."